(12) United States Patent
Galivel

(10) Patent No.: US 8,191,686 B2
(45) Date of Patent: Jun. 5, 2012

(54) DEVICE AND METHOD OF STANDBY LUBRICATION FOR AN ENGINE

(75) Inventor: Jean Pierre Galivel, Savigny le Temple (FR)

(73) Assignee: SNECMA, Paris (FR)

( * ) Notice: Subject to any disclaimer, the term of this patent is extended or adjusted under 35 U.S.C. 154(b) by 604 days.

(21) Appl. No.: 12/033,391

(22) Filed: Feb. 19, 2008

(65) Prior Publication Data

US 2008/0196974 A1 Aug. 21, 2008

(30) Foreign Application Priority Data

Feb. 21, 2007 (FR) ...................... 07 01236

(51) Int. Cl.
*F01M 11/10* (2006.01)
*F01M 1/18* (2006.01)
*F01M 1/08* (2006.01)
*F02C 7/06* (2006.01)
*F02G 3/00* (2006.01)

(52) U.S. Cl. ....... 184/6.4; 184/6.26; 184/6.11; 60/39.08

(58) Field of Classification Search ................. 184/6.4, 184/6.11, 6.26, 1.5; 701/114; 60/39.08; 280/29; 244/4 R; 123/196 S, 196 R
See application file for complete search history.

(56) References Cited

U.S. PATENT DOCUMENTS

| | | | | |
|---|---|---|---|---|
| 3,231,317 A | * | 1/1966 | Dudar | 384/624 |
| 4,038,815 A | | 8/1977 | Heitmann et al. | |
| 4,284,174 A | * | 8/1981 | Salvana et al. | 184/6.4 |
| 4,467,892 A | * | 8/1984 | Van de Bogert | 184/7.4 |
| 4,599,862 A | | 7/1986 | Bergeron | |
| 4,888,947 A | | 12/1989 | Thompson | |
| 5,125,480 A | * | 6/1992 | Gregory et al. | 184/6.26 |
| 5,568,984 A | | 10/1996 | Williams | |

FOREIGN PATENT DOCUMENTS

| | | |
|---|---|---|
| FR | 2 685 758 | 7/1993 |
| GB | 704020 | 2/1954 |
| GB | 2 075 134 A | 11/1981 |

* cited by examiner

*Primary Examiner* — Michael Mansen
*Assistant Examiner* — Robert Reese
(74) *Attorney, Agent, or Firm* — Oblon, Spivak, McClelland, Maier & Neustadt, L.L.P.

(57) ABSTRACT

A method of providing a standby lubrication for an engine in the event of the failure of a main lubrication system of this engine, in which the failure is detected and, in response to the detection of this failure, at least one portion of a fuel fluid of the engine is tapped off to lubricate at least one element of the engine. A standby lubrication device includes a device for detecting a failure of a main lubrication system, a device for tapping off at least a portion of a fuel fluid of the engine in order to direct it to at least one element of the engine intended to be lubricated, and a controller connected to the tapping and detection devices, in order to carry out the standby lubrication method.

19 Claims, 1 Drawing Sheet

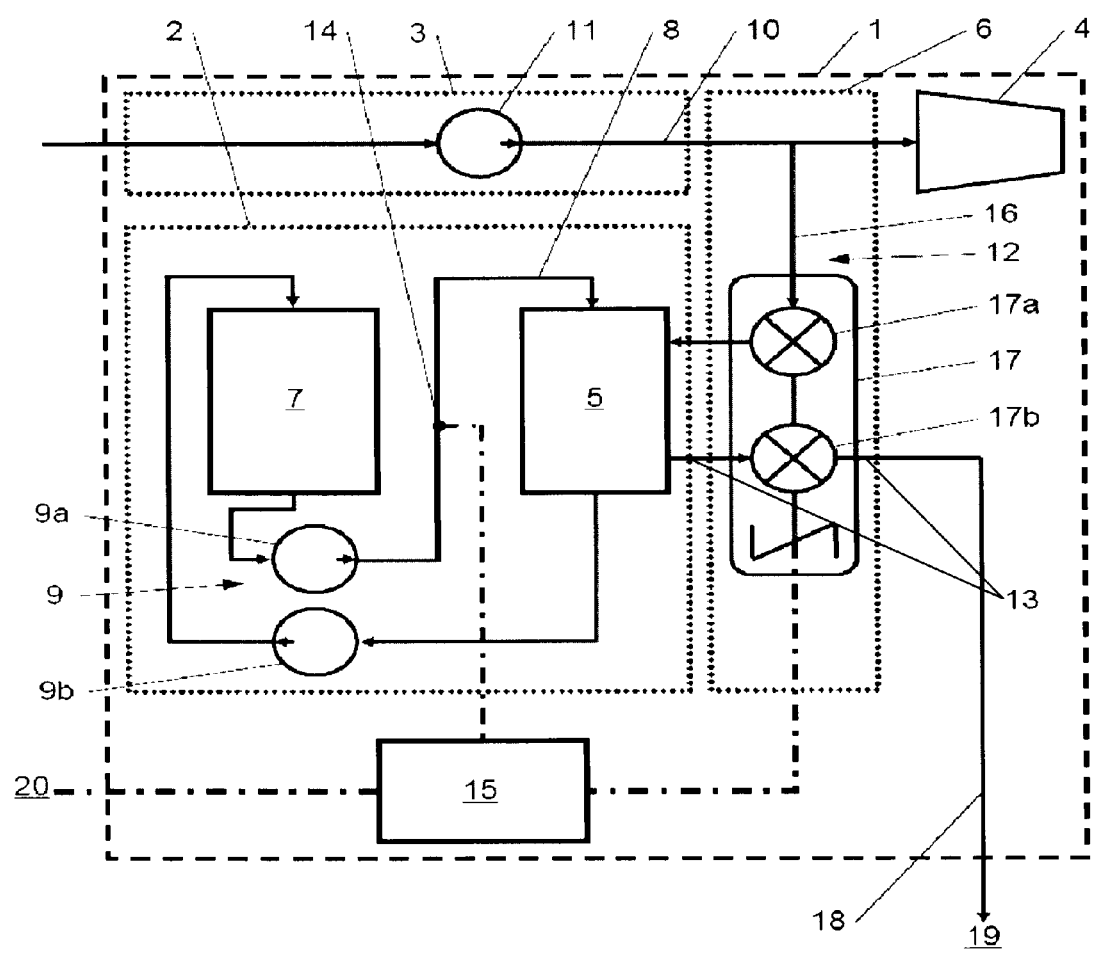

DEVICE AND METHOD OF STANDBY LUBRICATION FOR AN ENGINE

The present invention relates to a device and method for the standby lubrication of an engine, and more particularly for an engine of the gas turbine type, such as a turbojet.

BACKGROUND OF THE INVENTION

"Engine" is understood to be any device generating movement, preferably by combustion of a fuel fluid, such as, for example, a reciprocating piston engine, a four-stroke or Diesel engine, a rotary piston engine, for example of the Wankel type, a turbine, such as for example a turboprop or turbojet with single or double spool, an electric motor supplied by a fuel cell, etc. Such engines may be used in the propulsion of a vehicle or for other applications, such as the generation of electric power, the operation of machines, such as, for example, pumps or compressors, etc.

DESCRIPTION OF THE PRIOR ART

The engines of the prior art conventionally comprise a lubrication system designed to lubricate and if necessary cool bearings and gears in the engine, the accessory drive gearbox included.

Such a conventional lubrication system usually consists of a reservoir of lubricant fluid, for example of oil, a feed and return pipe and a lubricant fuel pump to circulate the lubricant from the reservoir to the elements to be lubricated and return to the reservoir through said feed and return pipe. In addition, it is usually a known practice also to include therein a filter in order to ensure that impurities that may damage the elements to be lubricated are not circulated with the lubricant fluid to these elements to be lubricated, a heat exchanger designed to cool the lubricant fluid, a lubricant fluid diffuser or spray nozzle to distribute the lubricant fluid in said elements to be lubricated and temperature and pressure sensors in order to monitor the operation of the system.

In the event of a failure of the lubrication system, the engine risks being damaged to the point of stopping. The temperature and pressure sensors monitor the correct operation of the system and may cause the engine to shut down in order to protect the latter from the harmful effects of operation without oil.

In certain applications, such an inopportune shutdown may be particularly dangerous and particular measures are taken to prevent it. For example, in an aircraft comprising a single engine for its propulsion, it is routine to arrange, in addition to the main lubrication system, a standby lubrication device designed to provide the aircraft with additional autonomy making it possible to divert to an airfield in the event of failure of the main lubrication system.

In the prior art, described for example in American patent U.S. Pat. No. 4,888,947, such a standby lubrication device comprises an accumulator of oil tapped from the main lubrication system to provide the minimal lubrication required and prolong the operation of the engine for a determined period, typically 20 minutes, after a failure of the main lubrication system. This standby lubrication device accordingly increases the volume of oil of the main lubrication system, and therefore the weight of the engine, but without having a use except for a possible failure of the main lubrication system. In addition, its use is limited in time.

In an aircraft comprising several engines for its propulsion, the shutdown of only one of its engines following a failure of its lubrication system is less dangerous, the other engine or engines usually being sufficient to allow a diversion to an airfield. Nevertheless, a simultaneous failure of all the lubrication systems may lead to the loss of the aircraft. This type of simultaneous failure has already been encountered, particularly following incorrect maintenance actions on the lubrication systems. The use of a standby lubrication device with an oil accumulator, as described above, would not prevent the multiple failure, nor the shutdown of the engines after the accumulator oil has been used up, whereas otherwise the engines may still be in perfect working order.

SUMMARY OF THE INVENTION

The problem of the present invention is therefore to provide an independent standby lubrication for one engine comprising a main oil lubrication system in the event that this lubrication system fails. This standby lubrication must be provided with a minimal weight penalty, a period of use limited only by the availability of the fluid used, and an easy adaptation to existing engines.

In addition, the present invention must make it possible to eliminate the risks associated with the concurrent failure of the lubrication systems in a plurality of engines. All this should result in a considerable increase in the level of safety.

DESCRIPTION OF THE PREFERRED EMBODIMENTS

According to the invention, the failure of the lubrication system is detected and, in response to the detection of this failure, at least one portion of the fuel fluid of the engine is tapped off to lubricate at least one engine element.

Although lubrication systems have been proposed, for example in U.S. Pat. No. 5,568,984, to lubricate and if necessary cool an engine with the fuel fluid of the latter, such lubrication systems, which are used in particular in jet engines used for the propulsion of missiles, are designed to lubricate the engine in a normal situation and not in the event of failure of another lubrication system. On the basis of these publications, it would not therefore have been evident for those skilled in the art to apply this solution to solve the problem of standby lubrication in the event of failure of a main lubrication system. Furthermore, these systems of lubrication with a fuel fluid in a normal situation make it possible to ensure only a modest lubrication compared with that obtained with a lubrication system with oil.

Preferably, in the method of the invention, said portion of engine fuel fluid tapped off for standby lubrication is directed into at least one enclosure in the engine, and said enclosure in the engine is drained in order to prevent an overfilling thereof when the fuel fluid is added to the oil of the main lubrication system in said enclosure.

Preferably, in this method, in response to the detection of this failure, the engine is also placed in a safety regime limiting its field of operation. This makes it possible to limit the number of engine elements requiring this standby lubrication in the event of failure of the main lubrication system and therefore also the quantity of fuel fluid employed for this standby lubrication and the means necessary for tapping it off.

The standby lubrication device of the invention comprises means for detecting a failure of the main lubrication system, means for tapping off at least a portion of a fuel fluid of the engine in order to direct it to at least one engine element intended to be lubricated, and control means capable of being connected to said detection and tapping means in order to activate said tapping means in response to a failure of the main lubrication system.

Preferably, said detection means comprise at least one oil low-pressure sensor, which forms a particularly simple means for detecting a failure of the main lubrication system.

In order to better lubricate the elements to be lubricated, it is preferable for said tapping means to discharge into at least one spray nozzle. If furthermore said spray nozzle comprises at least one spray nozzle of the main lubrication system, it prevents the duplication of elements, resulting in an advantageous weight gain.

Preferably, said tapping means comprise a tapping pipe with at least a first valve. Such a first valve has the advantage of making it possible easily to connect and disconnect the standby lubrication device to/from a fuel fluid feed circuit of the engine in order to tap at least a portion thereof.

Preferably, the standby lubrication device also comprises means for draining at least one enclosure in the engine, said control means also being capable of being connected to said drainage means in order to activate said drainage means in response to a failure of the main lubrication system. These drainage means make it possible to prevent overfilling of this enclosure when the fuel fluid is added to the oil of the main lubrication system in said enclosure.

Preferably, said drainage means comprise a drainage pipe with at least a second valve. Such a second valve has the advantage of making it possible easily to drain said enclosure with a signal from said control means.

Advantageously, said first and second valves are functionally connected, so that the tapping of the fuel fluid for lubrication is always associated with the drainage of said enclosures. In this embodiment, preferably, said first and second valves are incorporated into a double valve with single control, which makes it possible to simplify the standby lubrication device, while ensuring that the tapping of fuel fluid for lubrication is always associated with the drainage of said enclosures.

More particularly, said drainage means comprise at least one discharge duct, opening, for example, into an engine air flow or else into a zone distant from the engine, which makes it possible to drain the oil and the fuel fluid from the enclosure into a zone presenting no danger.

The invention also relates to an engine comprising a main oil lubrication system and a standby lubrication device according to the invention. In particular, said engine is an engine of the gas turbine type, a type of engine whose lubrication needs are particularly great.

The invention also relates to a vehicle comprising an engine according to the invention. Vehicles have a particularly critical need for engine reliability, and particularly engines providing the propulsion of the vehicles. This need is even more critical in aircraft.

BRIEF DESCRIPTION OF THE DRAWINGS

Details concerning the invention are described below making reference to the drawings.

The single FIGURE represents schematically an embodiment of the engine of the invention with the main lubrication system and the standby lubrication device.

DESCRIPTION OF THE PREFERRED EMBODIMENTS

The illustrated engine 1 is, for example, an aircraft propulsion element, an application in which reliability is a priority. It is however conceivable to apply the invention in engines for propelling other types of vehicles, or even for other applications, such as the generation of electric power in an onboard or fixed generator. The illustrated engine 1 is furthermore of the gas turbine type and more particularly a turbojet, but it is also conceivable to apply the invention to other types of engines.

The illustrated engine 1 comprises a main lubrication system 2, a feed system 3 for feeding a combustion chamber 4 with a fuel fluid, an enclosure 5 containing elements of the engine 1 to be lubricated and cooled, such as bearings and/or gears, and a standby lubrication device 6.

The main lubrication system 2 feeds, in operation, a lubricant fluid to lubricate the elements in the enclosure 5. For this, the main lubrication system 2 comprises a reservoir 7, a feed and return pipe 8 and a pump 9, comprising, in the embodiment illustrated, a feed pump 9a and a return pump 9b. In the illustrated embodiment, the lubricant fluid is oil.

In the normal state of operation of the main lubrication system 2, the pump 9 circulates the oil through the pipe 8 from the reservoir 7 to the enclosure 5 and returns it to the reservoir 7. In addition to the elements illustrated, the main lubrication system 2 may also comprise a filter to ensure that impurities that may damage the elements to be lubricated are not circulated with the lubricant fluid to these elements to be lubricated, a heat exchanger designed to cool the lubricant fluid, a lubricant fluid diffuser or spray nozzle to distribute the lubricant fluid in the enclosure 5 and temperature and pressure sensors 14 in order to check the pressure and the temperature of the lubricant fluid, which makes it possible to detect a malfunction of the circuit and valves in the pipe 8 in order to control the circulation of the lubricant fluid in response to its temperature and pressure.

The feed system 3 comprises in particular a fuel fluid pipe 10 and a fuel fluid pump 11. This feed system 3 is regulated by a system for controlling the operation of the engine 1 and provides a fuel fluid pressure and flow allowing the operation of the engine 1.

The standby lubrication device 6 comprises fuel fluid tapping means 12, drainage means 13, a low-pressure sensor 14 installed in the pipe 8 of the main lubrication system 2 and control means 15 connected to the low-pressure sensor 14.

The tapping means 12 comprise a tapping pipe 16 connected to the fuel fluid pipe 10 and opening into the enclosure 5, where necessary into spray nozzles that may be the spray nozzles of the main lubrication system 2 and/or independent spray nozzles, adapted according to the viscosity of the fuel fluid and the pressure and flow necessary for standby lubrication. The standby lubrication device 6 does not necessarily have to provide fuel fluid to all the elements of the engine 1 that are normally lubricated by the main lubrication system 2, but may be limited to providing fuel fluid to lubricate the elements of the engine 1 requiring such lubrication to prevent a shutdown of the engine 1 running in a safety regime.

The tapping means 12 also comprise, on the tapping pipe 16, a first valve 17a that is electrically or mechanically controlled and connected to control means 15, so as to open or close the fuel fluid flow through the tapping pipe 16 in response to signals from the control means 15.

The drainage means 13 comprise a drainage pipe 18 connected to the enclosure 5 and opening onto the outside through at least one discharge duct 19. Said discharge duct 19 is situated in a zone where the discharge of the lubricant and/or fuel fluids does not present a danger. For example, in a twin-spool turbojet surrounded by a nacelle, said discharge duct 19 may be situated in the engine airflow or outside the nacelle, or in a recovery system commonly known as the "Ecology box".

The drainage means 13 also comprise a second valve 17b that is electrically or mechanically controlled and connected to the control means 15, so as to open or close the flow of fluid drained through the drainage pipe 18 in response to signals from the control means 15.

In the embodiment illustrated, the first valve 17a and the second valve 17b are incorporated into a double valve 17 with single control controlled by the control means 15.

In the event of failure of the main lubrication system 2, the low-pressure sensor 14 signals the failure to the control means 15. In response to this signal, the control means 15 then command the opening of the double valve 17, so as to tap from the fuel fluid pipe 10 at least a portion of the fuel fluid in order to lubricate the elements of the engine 1 and to drain the enclosure 5 in order to prevent it being overfilled. The drainage will first cause an emptying of a mixture of oil and fuel fluid, then fuel fluid only.

In response to the signal from the low-pressure sensor 14, the control means may also trigger a pilot alarm 20 and/or place the engine 1 in a safety regime. In such a safety regime, the speed, the engine torques or forces or the power generated by the engine may for example be limited in order to limit the heating by friction to be taken into account for the dimensioning of the standby lubrication device. This makes it possible to limit the number of elements of the engine 1 to be lubricated by the standby lubrication device 6 in the event of failure of the main lubrication system 2. In this safety regime, and with the standby lubrication with the fuel fluid, an aircraft propelled by the engine 1 will have a greater margin of maneuver to decide on a diversion to an alternate airfield.

In another embodiment, the first and/or second valves 17a, 17b may be controlled by an automatic valve system reacting to an abnormal pressure change and representing a failure of the main lubrication system, which makes it possible to dispense with the low-pressure sensor 14 and separate control means 15.

The standby lubrication device 6 being substantially independent of the main lubrication system 2, its dimensioning may be adapted to the necessities of good operation. Apart from the possibility of limiting the number of elements lubricated by the standby lubrication device 6 according to the limitations of the safety regime and of adaptation of the spray nozzles to the viscosity of the fuel fluid and to the pressure and flow of the standby lubrication device 6, it is also possible to interpose, in the tapping pipe 16, independent pressure regulation means such as a diaphragm and/or a pressure limiter.

Although the present invention has been described with reference to specific exemplary embodiments, it is evident that modifications may be made to these examples without departing from the general scope of the invention as defined by the claims. Consequently, the description must be considered to be illustrative rather than descriptive.

REFERENCE NUMBERS IN THE FIGURES

1 Engine
2 Main lubrication system
3 Feed system
4 Combustion chamber
5 Enclosure
6 Standby lubrication device
7 Reservoir
8 Pipe
9 Pump
9a Feed pump
9b Return pump
10 Fuel fluid pipe
11 Fuel fluid pump
12 Tapping means
13 Drainage means
14 Low-pressure sensor
15 Control means
16 Tapping pipe
17 Double valve
17a First valve
17b Second valve
18 Drainage pipe
19 Discharge duct
20 Pilot alarm

The invention claimed is:

1. A method for lubricating an engine in the event of a failure of a main lubrication system of said engine, said method comprising:
   feeding a fuel fluid to a combustion element of said engine during normal operating conditions,
   providing lubrication with said main lubrication system to a mechanical element of said engine during said normal operating conditions, wherein said lubrication does not include any of said fuel fluid during said normal operating conditions,
   detecting said failure of said main lubrication system; and
   in response to said detecting of said failure, tapping at least a portion of said fuel fluid to lubricate at least said mechanical element of said engine such that said lubrication for said mechanical element includes said portion of said fuel fluid during said failure of said main lubrication system.

2. The method as claimed in claim 1, wherein said portion of the engine fuel fluid is directed into at least one enclosure in the engine that contains said mechanical element and said enclosure is drained in order to prevent any overfilling.

3. The method as claimed in claim 2, wherein said lubrication includes oil during said normal operating conditions, and
   wherein, during a period of said failure of the main lubrication system, only fuel fluid is drained from said enclosure without any of said oil being drained.

4. The method as claimed claim 1, wherein, in response to detecting said failure, the engine is placed in a safety regime limiting its field of operation.

5. An engine comprising:
   a combustion element configured to be fed with a fuel fluid during normal operating conditions;
   a mechanical element for said engine;
   a main lubrication system providing a lubrication to said mechanical element, wherein said lubrication does not include any of said fuel fluid during said normal operating conditions;
   a standby lubrication device comprising detection means for detecting a failure of the main lubrication system, said standby lubrication device further comprising tapping means for tapping off, in response to said failure of the main lubrication system, at least a portion of said fuel fluid of the engine in order to direct said fuel fluid to at least said mechanical element such that said lubrication for the mechanical element includes said portion of said fuel fluid during said failure of said main lubrication system, and wherein said standby lubrication device further comprises control means for controlling said tapping means and said detection means.

6. The engine as claimed in claim 5, wherein said detection means comprise at least one low-pressure sensor.

7. The engine as claimed in claim 5, wherein said tapping means discharge into at least one spray nozzle.

8. The engine as claimed in claim 7, wherein said spray nozzle comprises at least one spray nozzle of the main lubrication system.

9. The engine as claimed in claim 5, wherein said tapping means comprise a tapping pipe with at least a first valve.

10. The engine as claimed in claim 5, also comprising drainage means for draining at least one enclosure containing said mechanical element, said control means also being for controlling said drainage means.

11. The engine as claimed in claim 10, wherein said drainage means comprise a drainage pipe with at least a second valve.

12. The engine as claimed in claim 11, wherein said first and second valves are functionally connected.

13. The engine as claimed in claim 12, wherein said first and second valves are incorporated into a double valve with single control.

14. The engine as claimed in claim 10, wherein said lubrication includes oil during said normal operating conditions, and wherein said drainage means is for draining, during a period of said failure of the main lubrication system, only fuel fluid from said container enclosure without any of said oil being drained.

15. The engine as claimed in claim 10, wherein said drainage means comprise at least one discharge duct, discharging into an engine air flow.

16. The engine as claimed in claim 5, wherein the lubrication during normal operating conditions is oil.

17. The engine as claimed in claim 16, wherein the combustion element is a combustion chamber of a gas turbine engine.

18. A vehicle comprising at least one engine as claimed in claim 5.

19. An aircraft comprising at least one engine as claimed in claim 5.

* * * * *

UNITED STATES PATENT AND TRADEMARK OFFICE
CERTIFICATE OF CORRECTION

| | | |
|---|---|---|
| PATENT NO. | : 8,191,686 B2 | Page 1 of 1 |
| APPLICATION NO. | : 12/033391 | |
| DATED | : June 5, 2012 | |
| INVENTOR(S) | : Jean Pierre Galivel | |

It is certified that error appears in the above-identified patent and that said Letters Patent is hereby corrected as shown below:

In column 8, line 6, delete "container".

Signed and Sealed this
Twenty-eighth Day of August, 2012

David J. Kappos
*Director of the United States Patent and Trademark Office*